United States Patent [19]

Fujioka et al.

[11] Patent Number: 5,020,114
[45] Date of Patent: May 28, 1991

[54] OBJECT DISCRIMINATING APPARATUS AND METHOD THEREFOR

[75] Inventors: Arisa Fujioka, Kawaguchi; Takashi Konda, Yokohama, both of Japan

[73] Assignee: Kabushiki Kaisha Toshiba, Kawasaki, Japan

[21] Appl. No.: 233,128

[22] Filed: Aug. 17, 1988

[30] Foreign Application Priority Data

Aug. 17, 1987 [JP] Japan ................................ 62-203707

[51] Int. Cl.$^5$ ............................................... G06K 9/00
[52] U.S. Cl. ........................................... 382/44; 382/1; 382/28; 356/379
[58] Field of Search ................. 382/1, 44, 28; 356/379

[56] References Cited

U.S. PATENT DOCUMENTS

| | | | |
|---|---|---|---|
| 4,007,440 | 2/1977 | Kono et al. | 340/146.3 |
| 4,646,354 | 2/1987 | Naito et al. | 382/28 |
| 4,752,964 | 1/1988 | Okada et al. | 382/1 |
| 4,965,844 | 10/1990 | Oka et al. | 382/44 |

OTHER PUBLICATIONS

Article from Principles of Interactive Computer Graphics; Entitled: "Three Dimensional Transformations and Perspective"; pp. 333-365.

*Primary Examiner*—David K. Moore
*Assistant Examiner*—Daniel Santos
*Attorney, Agent, or Firm*—Oblon, Spivak, McClelland, Maier & Neustadt

[57] ABSTRACT

An object sensor outputs an obstacle detection signal in response to passing of an obstacle. A central control unit reads a 2-dimensional image from an imaging unit in response to the obstacle detection signal. A detection area is obtained by subtracting a background image prestored in a memory from the input 2-dimensional image. The detected image on a 2-dimensional plane is transformed into image data in a 3-dimensional space. The CCU computes the projection area of the image data on an arbitrary plane in the 3-dimensional space. The object is discriminated by comparing the computed projection area with the projection area based on the reference value of the object prestored in the memory.

7 Claims, 5 Drawing Sheets

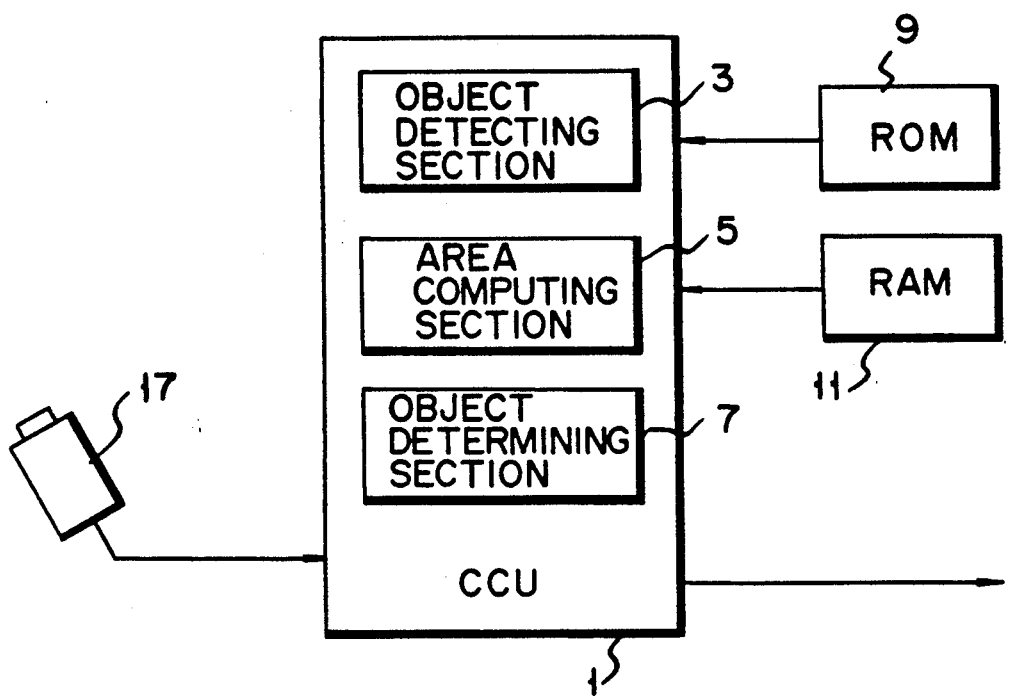
F I G. 1
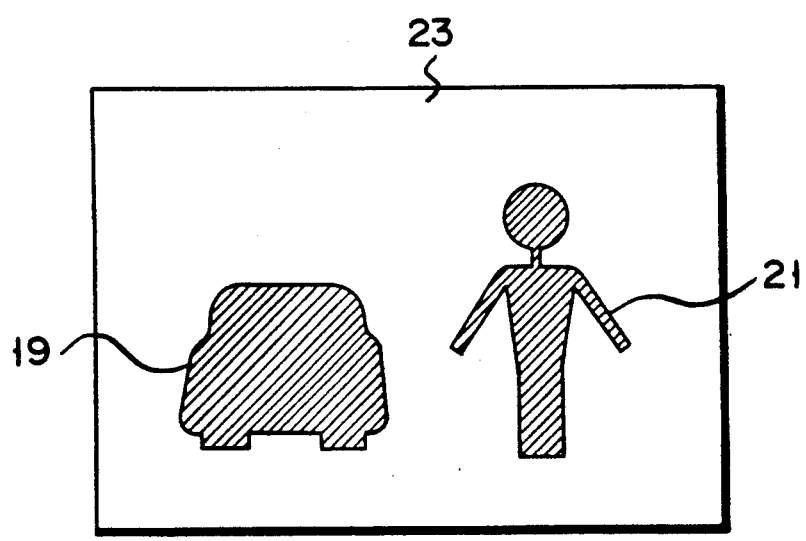
F I G. 2

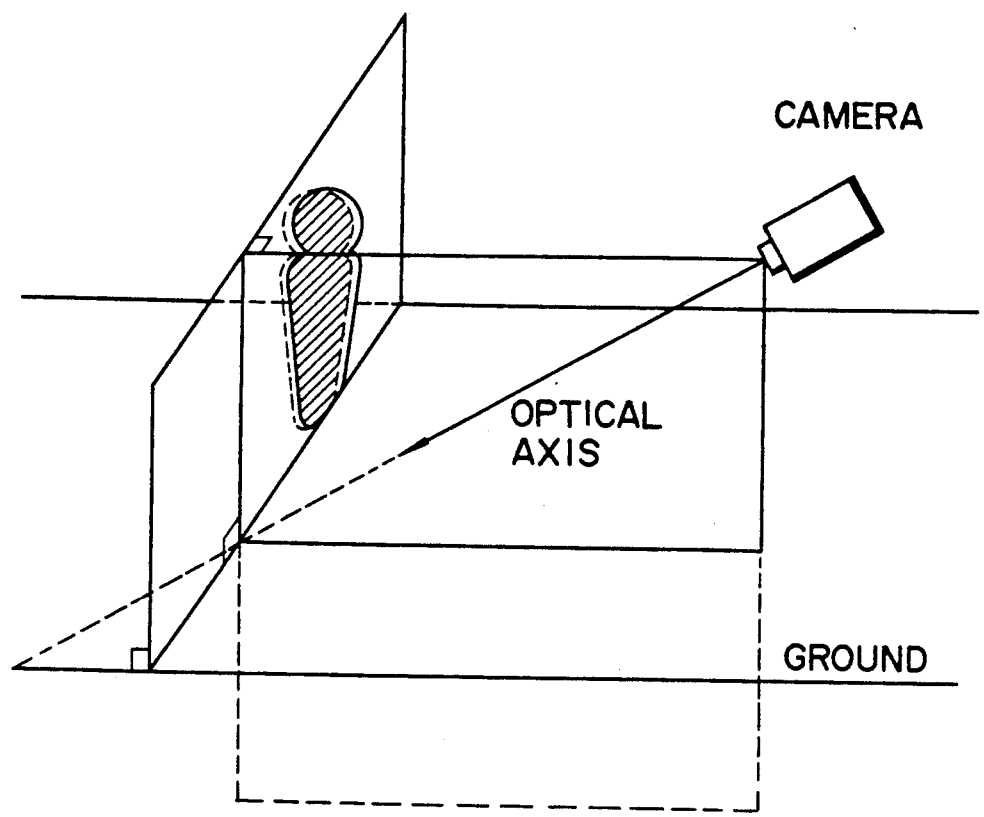
F I G. 6

OBJECT DISCRIMINATING APPARATUS AND METHOD THEREFOR

BACKGROUND OF THE INVENTION

1. Field of the Invention

The present invention relates to an object discriminating apparatus used for discrimination of vehicles, men, and the like for, e.g., automatic steering of vehicles, and a method therefor.

2. Description of the Related Art

In modern society, vehicles have become indispensable as a transportation means. However, many traffic accidents occur by careless driving. For this reason, the study of automatic steering of vehicles has been recently made from the viewpoint of prevention against traffic accidents.

The study of automatic steering of vehicles is branched into various subjects. One of important subjects is concerned with detection and discrimination of an obstacle, wherein an obstacle is detected from a photographic image and the type of the obstacle is discriminated. As a conventional method of detecting an obstacle using a photographic image, a method of determining an object, which is crossing road boundaries on an image, to be an obstacle is known (32nd (first semiannual conference, 1986) National Conference Preliminary Reports 6N-8, pp. 1943-1944, Information Processing Society). According to another known method, a vehicle traveling ahead is determined by detecting horizontal edges in an image on the basis of the fact that the image of a vehicle includes a large number of horizontal edges compared with background image (Journal of the Information Processing Society (Japan), vol. 27, No. 7, pp. 663-690).

In both the above-described methods, however, only an obstacle is detected, but the type of the obstacle cannot be discriminated.

SUMMARY OF THE INVENTION

It is an object of the present invention to provide an object discriminating apparatus, which can detect an object from a photographic image and discriminate the type of the object, and a method therefor.

In order to achieve the above object, there is provided an object discriminating apparatus comprising: image photographing means for photographing an image; object detecting means for detecting an object from the photographic image photographed by the image photographing means; area computing means for computing a projection area of the object detected by the object detecting means in an arbitrary plane of a 3-dimensional space; and object discriminating means for discriminating the object on the basis of the projection area computed by the area computing means.

According to the present invention, a method of discriminating an object comprises the steps of: photographing an image; detecting an object from the photographic image, computing a projection area of the detected object in an arbitrary plane of a 3-dimensional space, and discriminating the object on the basis of the computed projection area.

According to the object discriminating apparatus and the method therefor of the present invention, the projection area of an object in an arbitrary plane of a 3-dimensional space is computed from a photographic image. Therefore, even if a distance between a photographing position and an obstacle is changed, an actual area can always be calculated, and hence discrimination of an object can be reliably performed.

BRIEF DESCRIPTION OF THE DRAWINGS

FIG. 1 is a block diagram showing an object discriminating apparatus according to an embodiment of the present invention;

FIG. 2 is a view illustrating a photographic image obtained by an image unit;

FIG. 6 is a view illustrating the projection areas of a vehicle and a pedestrian in an arbitrary plane of a 3-dimensional space.

DETAILED DESCRIPTION OF THE PREFERRED EMBODIMENT

Figure 3A:
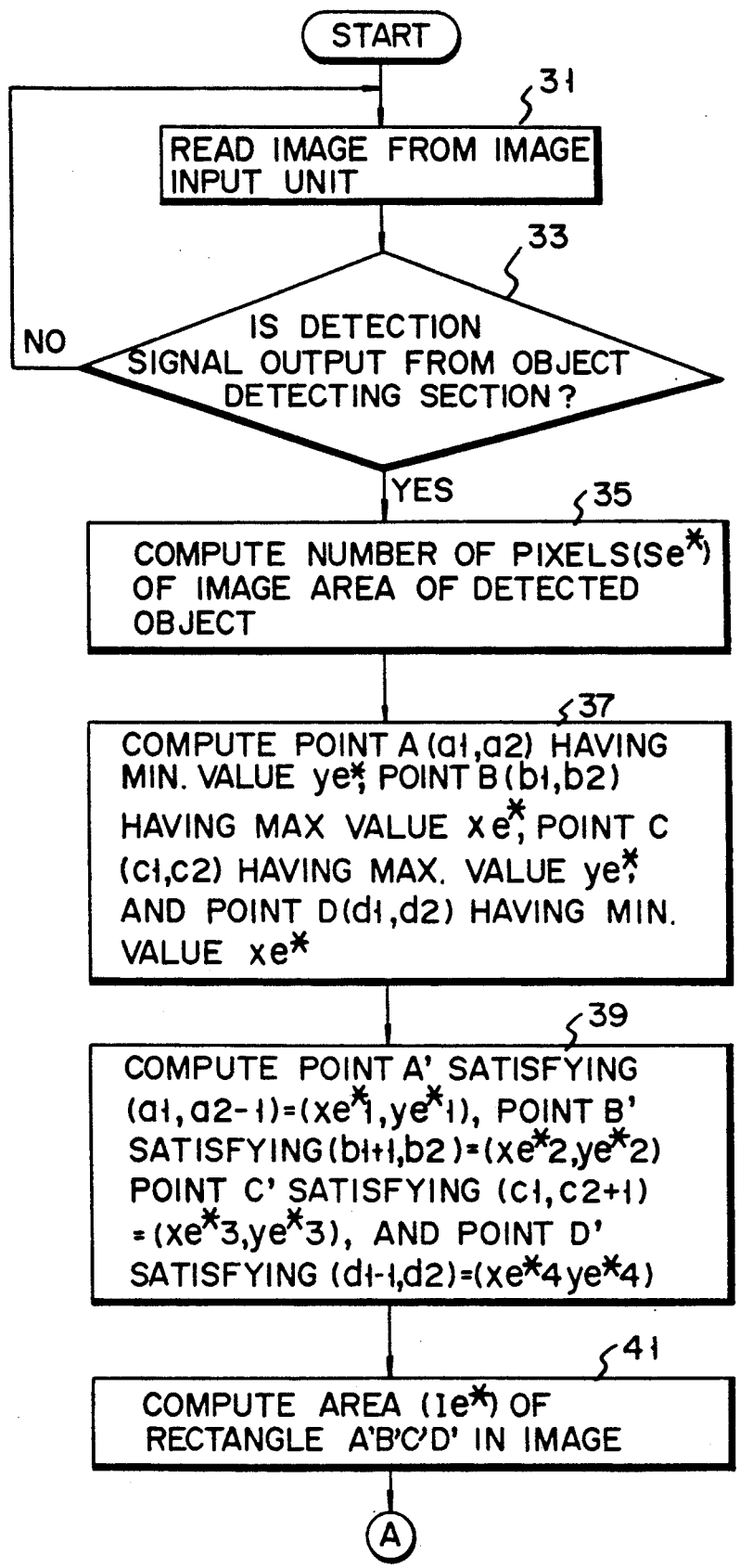
FIGS. 3A and 3B are flow charts showing processing of an object detecting section, an area computing section, and an object discriminating section in FIG. 1.

FIG. 1 is a block diagram showing an object discriminating apparatus according to an embodiment of the present invention. Referring to FIG. 1, central control unit (CCU) 1 comprises object detecting section 3, area computing section 5, and object discriminating section 7. Imaging unit 17 is connected to CCU 1. Imaging unit 17 forms an image of a target visual field and outputs an image signal. Imaging unit 17 can be constituted by, e.g., an industrial television (ITV) camera such as an automatic focusing type of camera which is off the shelf. In addition, read-only memory (ROM) 9 for storing the program of the flow charts shown in FIGS. 3A and 3B, and random access memory (RAM) 11 serving as a work area for performing various calculations are connected to CCU 1. CCU 1 can be constituted by, e.g., a microcomputer. CCU 1, ROM 9, and RAM 11 can be integrated into a one-chip microcomputer.

FIG. 2 shows an example of image 23 photographed by imaging unit 17. In this embodiment, image 23 is constituted by vehicle 19 and pedestrian 21.

A case wherein vehicle 19 and pedestrian 21 are discriminated in image 23 by using the object discriminating apparatus of the present invention will be described below with reference to the flow charts in FIGS. 3A and 3B.

Figure 3B:
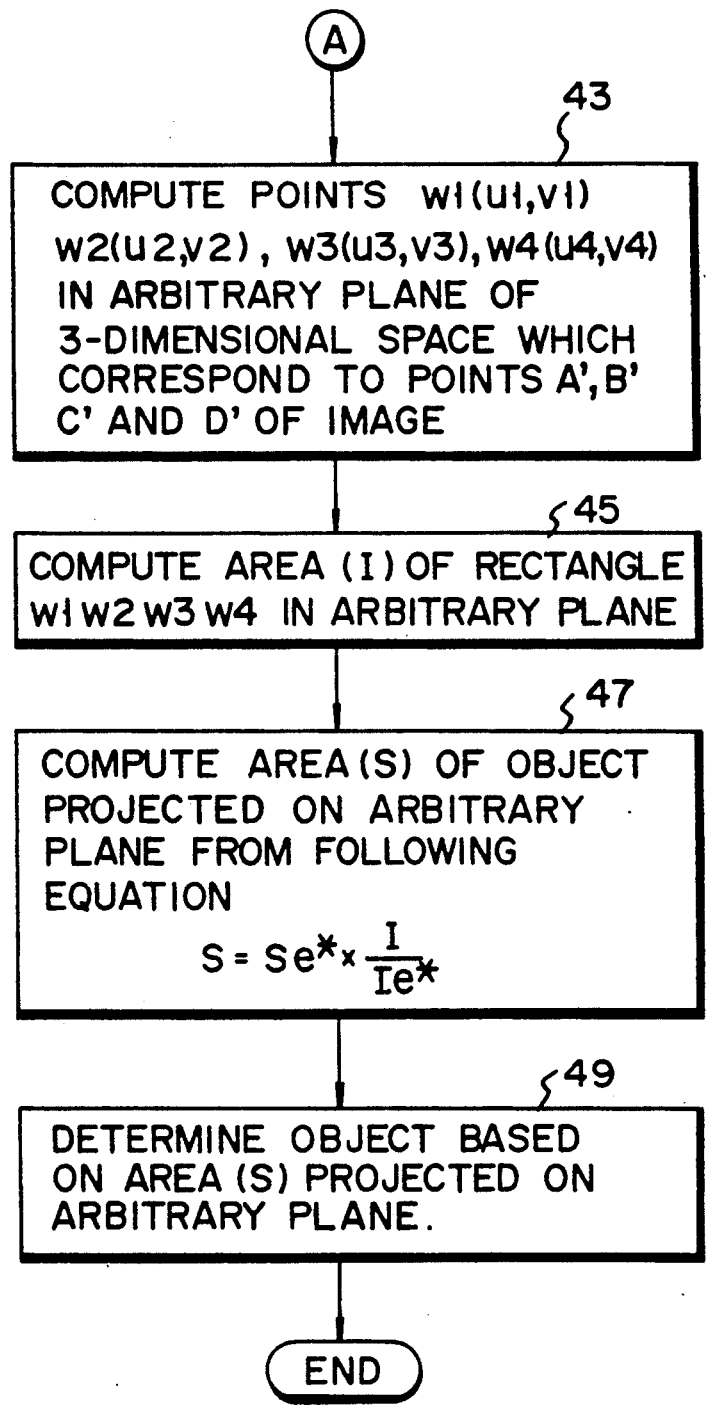

In step 31 in FIG. 3A, an image photographed by imaging unit 17 is read. In step 33, it is determined whether a detection signal is output from object detecting section 3. If NO is obtained, the flow returns to step 31. If YES in step 33, CCU 1 computes number $S^*_e$ of pixels of the image area of the detected object in step 35.

Since vehicle 19 and pedestrian 21 photographed by imaging unit 17 are transformed from 3-dimensional space data into 2-dimensional plane data, the 2-dimensional plane data must be perspectively transformed into the 3-dimensional space data.

If $x^* - y^*$ is a coordinate system prior to the transformation, and $x - y - z$ is a coordinate system after the transformation, transformation from 2-dimensional plane data into 3-dimensional space data can be represented by:

$$[xyz1] \begin{bmatrix} 1 & 0 & 0 & 0 \\ 0 & 1 & 0 & 0 \\ 0 & 0 & 1 & -1/h \\ 0 & 0 & 0 & 1 \end{bmatrix}$$

$$= [x^* \, y^* \, z^* \, \omega^*] \quad (1)$$

$$x^* = (X^*/\omega^*) \quad (2)$$
$$= (h \cdot x)/(h - z)$$
$$y^* = (Y^*/\omega^*) \quad (3)$$
$$= (h \cdot y)/(h - z)$$

where $x^* \text{-} y^* \text{-} z^* \text{-} \omega^*$ is a homogeneous coordinate system.

Equations (1) and (2) are related to equations of transformation when a viewpoint is located at a position of $z = h$ on the z-axis in a right-handed coordinate system. The position of $Z = h$ represents a focal position of the ITV camera. Since a viewpoint is located on the origin in an eye coordinate system ($x_e$ - $y_e$ - $z_e$), the related equations of transformation in the eye coordinate system can be represented by the following equations if $x^*_e$ - $y^*_e$ is a coordinate system prior to the transformation and $x^*_e$ - $y^*_e$ - $z^*_e$ - $\omega^*_e$ is a homogeneous coordinate system:

$$[x_e \, y_e \, z_e \, 1] \begin{bmatrix} 1 & 0 & 0 & 0 \\ 0 & 1 & 0 & 0 \\ 0 & 0 & 2 & 1/h \\ 0 & 0 & -h & 0 \end{bmatrix}$$

$$= [x^*_e \, y^*_e \, z^*_e \, \omega^*_e] \quad (4)$$
$$(x^*_e/\omega^*_e) \quad (5)$$
$$= h \cdot (x_e/z_e)$$
$$y^*_e = (y^*_e/\omega^*_e) \quad (6)$$
$$= h \cdot (y_e/z_e)$$

Therefore, the projection areas of vehicle 19 and pedestrian 21 in an arbitrary plane of a 3-dimensional space can be obtained using equations (5) and (6) in the following procedure. Note that plane P is perpendicular to a plane including the optical axis of a camera shown in FIG. 6 and to a plane (ground) with which the object is in contact.

Figure 4:
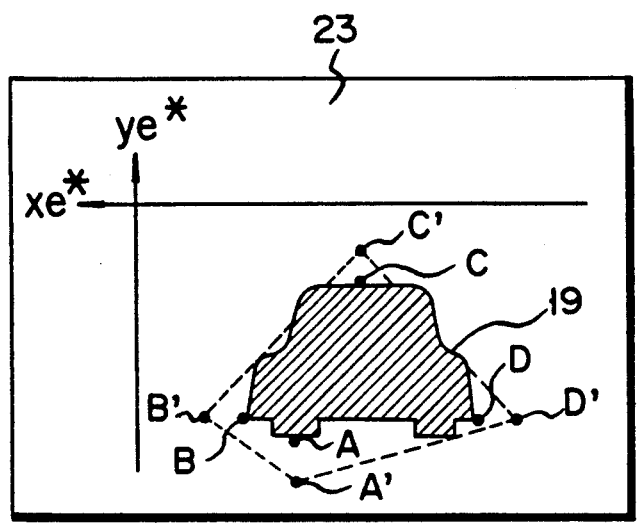
FIG. 4 is a view for explaining a method of computing the projection area of an object in an arbitrary plane of a 3-dimensional space using a photographic image.

First, in step 37, the coordinate system ($x^*_e$ - $y^*_e$) of photographic image 23 is set as shown in FIG. 4, and minimum values $y^*_e$ and $x^*_e$, and maximum values $y^*_e$ and $x^*_e$ of vehicle 19 and pedestrian 21 are respectively obtained. In step 39, point A' satisfying ($a_1$, $a_2$-1) = ($x^*_{e1}$, $y^*_{e1}$), point B' satisfying ($b_1$+1, $b_2$) = ($x^*_{e2}$, $y^*_{e2}$), point C' satisfying ($c_1$, $c_2$+1) = ($x^*_{e3}$, $y^*_{e3}$), and point D' satisfying ($d_1$-1, $d_2$) = ($x^*_{e4}$, $y^*_{e4}$) are obtained. In addition, in step 41, the area ($I^*_e$) of rectangle A'B'C'D' is computed. Area $I^*_e$ of the rectangle having vertexes A', B', C', and D' can be given by:

$$I^*_e = |(\tfrac{1}{2}) \{(x^*_{e2} - x^*_{e1})(y^*_{e2} + y^*_{e1}) + \quad (7)$$
$$(x^*_{e3} - x^*_{e2})(y^*_{e3} + y^*_{e2}) +$$
$$(x^*_{e4} - x^*_{e3})(y^*_{e4} + y^*_{e3}) +$$
$$(x^*_{e1} - x^*_{e4})(y^*_{e1} + y^*_{e4})\}|$$

Figure 5:
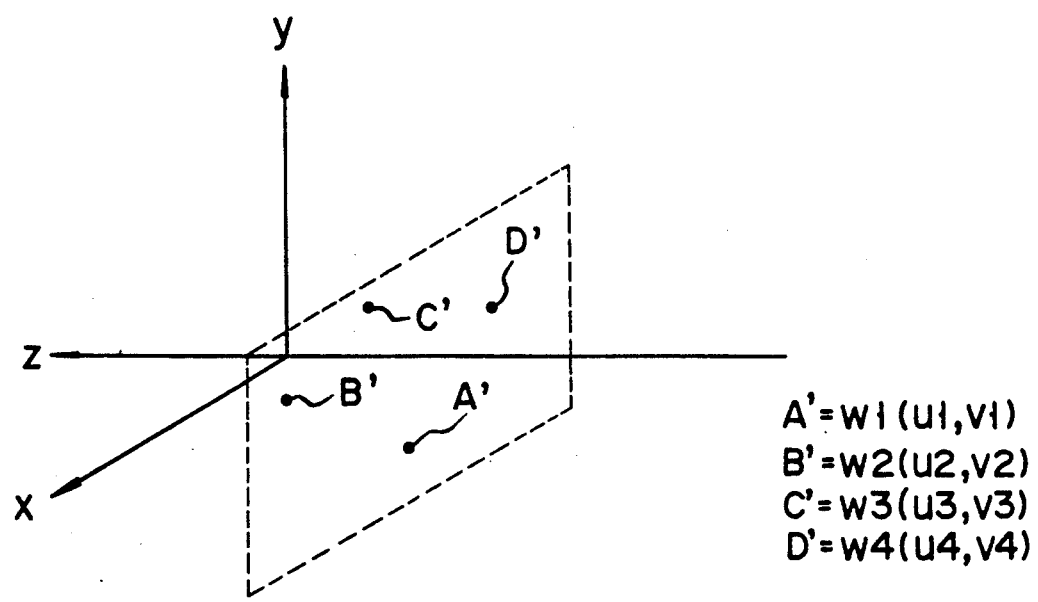
FIG. 5 is a view illustrating coordinate points A', B', C', and D' in an arbitrary plane of a 3-dimensional space when they are respectively set to be $\omega_1(u_1, v_1)$, $\omega_2(u_2, v_2)$, $\omega_3(u_3, v_3)$, and $\omega_4(u_4, v_4)$.

Subsequently, points A', B', C', and D' on photographic image 23 are transformed and the respective coordinates of points A', B', C', and D' in an arbitrary plane of a 3-dimensional space are obtained. More specifically, in step 43, points A', B', C', and D' on the image are transformed and corresponding points $\omega_1$ ($u_1$, $v_1$), $\omega_2$ ($u_2$, $v_2$), $\omega_3$ ($u_3$, $v_3$), and $\omega_4$ ($u_4$, $v_4$) in the arbitrary plane shown in FIG. 5 are computed. In addition, CCU 1 calculates the area (I) of rectangle $\omega_1$, $\omega_2$, $\omega_3$, $\omega_4$ the arbitrary plane. Area I of rectangle $\omega_1$ $\omega_2$, $\omega_3$, $\omega_4$ can be calculated by the following equation:

$$I = |(\tfrac{1}{2}) \{(u_2 - u_1)(v_2 + v_1) + \quad (8)$$
$$(u_3 - u_2)(v_3 + v_2) +$$
$$(u_4 - u_3)(v_4 + v_3) +$$
$$(u_1 - u_4)(v_1 + v_4)\}|$$

In step 47, CCU 1 calculates the projection area of the object on an arbitrary plane by the following equation:

$$S = S^*_e \cdot (I/I^*_e) \quad (9)$$

In step 49, CCU 1 discriminates the object on the basis of the projection area on the arbitrary plane. This processing is performed, for example, such that a standard projection area for each type of vehicle and a standard projection area of pedestrians are stored in RAM 11, and CCU 1 discriminates an object by comparing a calculated projection area with a projection area read out from RAM 11. Discrimination of an object may be performed by determining whether a projection area on an arbitrary plane of a 3-dimensional space exceeds a given threshold value or not. Upon comparison with a threshold value, even when only a vehicle or a pedestrian is photographed in a photographic image, the type of an obstacle can be discriminated. In the above-described embodiment, an object is detected by storing the density value of a road in advance and using it as a threshold value. However, an object may be detected by other known techniques, e.g., detecting horizontal edges in an image.

What is claimed is:

1. An object determining apparatus comprising:
   image capturing means for capturing an image;
   object detecting means for detecting an object from the image captured by said capturing means;
   means for subjecting those points on the image of the object detected by said object detecting means, which have maximum and minimum values at least in x- and y-directions, to a reverse perspective transformation into a given plane in a 3-dimensional space;
   means for calculating, on the basis of a ratio of an area defined by four points on the image to an area defined by four points after the reverse perspective transformation, a cross-sectional area of the object in a given plane after the reverse perspective transformation, from the area on the image; and
   means for comparing a value of the area calculated by said calculating means with a predetermined area value registered in advance, thereby determining the object.

2. A method of determining an object, comprising the steps of:
   capturing an image;
   detecting an object from the captured image;

subjecting those points on the image of the detected object, which have maximum and minimum values at least in x- and y-directions, to a reverse perspective transformation into a given plane in a 3-dimensional space;

calculating, on the basis of a ratio of an area defined by four points on the image to an area defined by four points after the reverse perspective transformation, a cross-sectional area of the object in a given plane after the reverse perspective transformation, from the area on the image; and comparing a value of the calculated area with a predetermined area value registered in advance, thereby determining the object.

3. An apparatus according to claim 1, wherein said area computing means transforms 2-dimensional plane data in an image area of the object detected by said object detecting means into 3-dimensional space data according to the following equations;

$$[x_e \ y_e \ z_e \ 1] \begin{bmatrix} 1 & 0 & 0 & 0 \\ 0 & 1 & 0 & 0 \\ 0 & 0 & 2 & 1/h \\ 0 & 0 & -h & 0 \end{bmatrix}$$

$$= [x^*_e \ y^*_e \ z^*_e \ \omega^*_e] \quad (1)$$

$$x^*_e = (x^*_e/\omega^*_e) \quad (2)$$

$$= h \cdot (x_e/z_e)$$

$$y^*_e = (y^*_e/\omega^*_e) \quad (3)$$

$$= h \cdot (y_e/z_e)$$

(where $X_e$ - $y_e$ - $z_e$ is an eye coordinate system, $x^*_e$ - $y^*_e$ is a coordinate system prior to transformation, and $x^*_e$ - $y^*_e$ - $z^*_e$ - $\omega^*_e$ is a homogeneous coordinate system), obtains minimum and maximum $y^*_e$ values, and minimum and maximum $x^*_e$ values in the extracted image area, obtains area $I^*_e$ of a rectangle in an image plane having points A', B', C', and D' as vertexes which are obtained by the following equation:

$$I^*_e = |(\tfrac{1}{2}) \{(x^*_{e2} - x^*_{e1})(y^*_{e2} + y^*_{e1}) + \quad (4)$$

$$(x^*_{e3} - x^*_{e2})(y^*_{e3} + y^*_{e2}) +$$

$$(x^*_{e4} - x^*_{e3})(y^*_{e4} + y^*_{e3}) +$$

$$(x^*_{e1} - x^*_{e4})(y^*_{e1} + y^*_{e4})\}|$$

(where point A having the minimum $y^*_e$ value is set as A $=(a_1, a_2)$, point B having the maxim $x^*_e$ value is set as B $=(b_1, b_2)$, point C having the maximum $y^*_e$ value is set as C $=(c_1, c_2)$, and point D having the minimum $x^*_e$ value is set as D $=(d_1, d_2)$, and a point $(a_1, a_2-1)$ is set as A'$=(x^*_{e1}, y^*_{e1})$, a point $(b_1+1, b_2)$ is set as B' $=(x^*_{e2}, y^*_{e2})$, a point $(c_1, c_2+1)$ is set as C' $=(x^*_{e3}, y^*_{e3})$, and a point $(d_1-1, d_2)$ is set as D'$=(x^*_{e4}, y^*_{e4})$), obtains area I of a rectangle having points $\omega_1$, $\omega_2$, $\omega_3$, and $\omega_4$ as vertexes using the following equation each point of A', B', C', and D' projected on an arbitrary plane of a 3-dimensional space are respectively set to be $\omega_1$ $(u_1, v_1)$, $\omega_2$ $(u_2, v_2)$, $\omega_3$ $(u_3, v_3)$, and $\omega_4$ $(u_4, v_4)$:

$$I = |(\tfrac{1}{2}) \{(u_2 - u_1)(v_2 + v_1) + \quad (5)$$

-continued $$(u_3 - u_2)(v_3 + v_2) +$$

$$(u_4 - u_3)(v_4 + v_3) +$$

$$(u_1 - u_4)(v_1 + v_4)\}|$$

and calculates a projected area of the detected object on the arbitrary plane of the 3-dimensional space using the following equations:

$$S = S^*_e \cdot (I/I^*_e) \quad (6)$$

where $S^*_e$ is a number of pixels of an extracted image.

4. An apparatus according to claim 1, wherein said object discriminating means comprises reference area value storing means for storing a reference value of an object to be discriminated, and discriminates the object by comparing the area obtained by said area computing means with the reference value read out from said reference area value storing means.

5. A method according to claim 2, wherein the step of detecting the object comprises the steps of:

prestoring a background image, which is an image before the object is captured, in a memory; and detecting existence of the object using a sensor, capturing an image including the object in response to an object detection signal from said sensor, and detecting the object by subtracting the background image prestored in said memory from the captured image.

6. A method according to claim 2, wherein the step of computing the area comprises the steps of transforming 2-dimensional plane data in an image area of the object detected by said object detecting means into 3-dimensional space data according to the following equations:

$$[x_e \ y_e \ z_e \ 1] \begin{bmatrix} 1 & 0 & 0 & 0 \\ 0 & 1 & 0 & 0 \\ 0 & 0 & 2 & 1/h \\ 0 & 0 & -h & 0 \end{bmatrix}$$

$$= [x^*_e \ y^*_e \ z^*_e \ \omega^*_e] \quad (1)$$

$$x^*_e = (x^*_e/\omega^*_e) \quad (2)$$

$$= h \cdot (x_e/z_e)$$

$$y^*_e = (y^*_e/\omega^*_e) \quad (3)$$

$$= h \cdot (y_e/z_e)$$

(wherein $x_e$ - $y_e$ $z_e$ is an eye coordinate system, $x^*_e$ - $y^*_e$ is a coordinate system prior to transformation, and $x^*_e$ - $y^*_e$ - $z^*_e$ - $\omega^*_e$ is a homogeneous coordinate system), obtaining minimum and maximum $y^*_e$ values, and minimum and maximum $x^*_e$ values in the extracted image area, obtaining area $I^*_e$ of a rectangle in an image plane having points A', B', C', and D' as vertexes which are obtained by the following equation:

$$I^*_e = |(\tfrac{1}{2}) \{(x^*_{e2} - x^*_{e1})(y^*_{e2} + y^*_{e1}) + \quad (4)$$

$$(x^*_{e3} - x^*_{e2})(y^*_{e3} + y^*_{e2}) +$$

$$(x^*_{e4} - x^*_{e3})(y^*_{e4} + y^*_{e3}) +$$

$$(x^*_{e1} - x^*_{e4})(y^*_{e1} + y^*_{e4})\}|$$

(where point A having the minimum $y^*_e$ value is set as $A = (a_1, a_2)$, point B having the maximum $x^*_e$ value is set as $B = (b_1, b_2)$, point C having the maximum $y^*_e$ value is set as $C = (c_1, c_2)$, and point D having the minimum $x^*_e$ value is set as $D = (d_1, d_2)$, and a point $(a_1, a_2-1)$ is set as $A' = (x^*_{e1}, y^*_{e1})$, a point $(b_1+1, b_2)$ is set as $B' = (x^*_{e2}, y^*_{e2})$, a point $(c_1, c_2+1)$ is set as $C' = (x^*_{e3}, y^*_{e3})$, and a point $(d_1-1, d_2)$ is set as $D' = (x^*_{34}, y^*_{e4})$), obtaining area I of a rectangle having points $\omega_1, \omega_2, \omega_3,$ and $\omega_4$ as vertexes using the following equation when each point of A', B', C', and D' projected on an arbitrary plane of a 3-dimensional space are respectively set to be $\omega_1 (u_1, v_1), \omega_2 (u_2, v_2), \omega_3 (u_3, v_3),$ and $\omega_4 (u_4, v_4)$:

$$I = |(\tfrac{1}{2}) \{(u_2 - u_1)(v_2 + v_1) + (u_3 - u_2)(v_3 + v_2) + (u_4 - u_3)(v_4 + v_3) + (u_1 - u_4)(v_1 + v_4)\}| \quad (5)$$

and calculating a projected area of the detected object on the arbitrary plane of the 3-dimensional space using the following equation:

$$S = S^*_e \cdot (I/I^*_e) \quad (6)$$

where $S^*_e$ is a number of pixels of an extracted image.

7. A method according to claim 2, wherein the step of discriminating the object comprises the steps of prestoring a reference value of the object to be discriminated in a reference area value memory, and comparing the area obtained by the step of computing the area with the reference value read out from said reference area value memory.

* * * * *